US007840527B2

(12) United States Patent
Kahn et al.

(10) Patent No.: US 7,840,527 B2
(45) Date of Patent: Nov. 23, 2010

(54) PLATFORM FOR FEEDS

(75) Inventors: Jessica Kahn, San Francisco, CA (US); Jens Alfke, San Jose, CA (US); Albert Riley Howard, Jr., Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/370,644

(22) Filed: Mar. 7, 2006

(65) Prior Publication Data

US 2006/0161845 A1 Jul. 20, 2006

Related U.S. Application Data

(63) Continuation of application No. 11/105,637, filed on Apr. 13, 2005.

(51) Int. Cl.
*G06F 7/00* (2006.01)
*G06F 17/00* (2006.01)
*G06F 17/30* (2006.01)

(52) U.S. Cl. ................ 707/608; 707/611; 707/943; 715/234

(58) Field of Classification Search ............. 707/608, 707/611, 943; 715/234
See application file for complete search history.

(56) References Cited

U.S. PATENT DOCUMENTS

| | | | |
|---|---|---|---|
| 5,602,981 A | 2/1997 | Hargrove | |
| 5,864,870 A | 1/1999 | Guck | |
| 5,867,164 A | 2/1999 | Bornstein et al. | |
| 5,995,102 A | 11/1999 | Rosen et al. | |
| 6,088,731 A | 7/2000 | Kiraly et al. | |
| 6,178,460 B1 | 1/2001 | Maddalozzo, Jr. et al. | |
| 6,272,493 B1 | 8/2001 | Pasquali | |
| 6,476,833 B1 | 11/2002 | Moshfeghi | |
| 6,664,974 B2 | 12/2003 | Lindstrom-Tamer | |
| 6,782,379 B2 | 8/2004 | Lee | |
| 7,058,661 B2 | 6/2006 | Ciaramitaro et al. | |
| 7,117,429 B2 * | 10/2006 | Vedullapalli et al. | ........ 715/235 |
| 7,246,014 B2 | 7/2007 | Forth et al. | |
| 2002/0108115 A1 | 8/2002 | Palmer | |
| 2005/0193341 A1 | 9/2005 | Hayward et al. | |
| 2005/0216837 A1 | 9/2005 | Washburn | |
| 2006/0167860 A1 | 7/2006 | Eliashberg et al. | |
| 2007/0083520 A1 | 4/2007 | Shellen et al. | |
| 2008/0126476 A1 | 5/2008 | Nicholas et al. | |

OTHER PUBLICATIONS

Marc Orchant, "Web info managers: Onfolio 2.0", posted Jan. 23, 2005, printed Sep. 29, 2008 from web archive dated Mar. 1, 2005, The Tablet PCs Weblog, www.tabletpcs.weblogsinc.com, pp. 1-5.*
Steve Hall, "Northwest VC: Intelligent Browsing—meet Onfolio 2.0", posted Jan. 27, 2005, printed Sep. 29, 2008 from web archive dated Feb. 12, 2005, nwvc.blogs.com, pp. 1-5.*
Barzeski, Erik J.; "PulpFiction | NSLog();"; http://nslog.com/2004/04/15/pulpfiction; posted Apr. 15, 2004; printed Mar. 15, 2010, 50 pages.*
Hyatt, D., "Rise of the Uber-Browser—Comments", [online], 2003 [Retrieved on Sep. 29, 2005], Retrieved from the Internet: <URL: http://weblogs.mozillazine.org/mt/comment.cgi?entry_id=2403>.
Parks, G., "Shrook 2", [online], Oct. 9, 2004 [Retrieved on Sep. 29, 2005], Retrieved from the Internet: <URL:http://web.archive.org/web/20041010075315/www.fondantfancies.com/shrook/>.
Simmons, B., "Weblog—Apr. 20, 2004", [online], Apr. 20, 2004 [Retrieved on Sep. 29, 2005], Retrieved from the Internet: <URL:http://inessential.com/2004/04/20.php>.
Archive of Bokma, J., "RSS and Live Bookmarks," [online] [Archived by http://archive.org on Nov. 17, 2004; Retrieved Apr. 12, 2007] Retrieved from the Internet <URL: http://web.archive.org/web/20041117034113/http://johnbokma.com/f...>.
Archive of Business Bureau-uk, Small Business Information Resource, "Managing Favorites," last updated Jan. 7, 2002, [online] [Archived by http://archive.org on Dec. 21, 2002; Retrieved on Apr. 15, 2008] Retrieved from the Internet <URL: http://web.archive.org/web/20021221082348/http://www.businessbureau-uk.co.uk/ecommerc...>.
Archive of "Firefox Help—Tutorials: Bookmarks (The Mozilla Help Site)," mozilla.gunnars.net, [online] [Archived by http://archive.org on Mar. 12, 2005; Retrieved on Feb. 5, 2007] Retrieved from the Internet<URL:http://web.archive.org/web/20050312075109/http://mozilla.gunnars.net/firefox_bookmarks_tu...>.

(Continued)

*Primary Examiner*—Jacob F Bétit
(74) *Attorney, Agent, or Firm*—Fenwick & West LLP

(57) ABSTRACT

Techniques for detecting, managing, and presenting syndication XML (feeds) are disclosed. In one embodiment, a web browser automatically determines that a web site is publishing feeds and notifies the user, who can then access the feed easily. In another embodiment, a browser determines that a web page or feed is advertising relationship XML, and displays information about the people identified in the relationship XML. In yet another embodiment, a browser determines that a file contains a feed and enables the user to view it in a user-friendly way. In yet another embodiment, feed state information is stored in a repository that is accessible by applications that are used to view the feed. In yet another embodiment, if a feed's state changes, an application notifies the repository, and the state is updated. In yet another embodiment, a feed is parsed and stored in a structured way.

15 Claims, 12 Drawing Sheets

OTHER PUBLICATIONS

Archive of Gregorio, J., "BitWorking Theories on Software Development: Aggie," [online] [Archived by http://archive.org on Jun. 18, 2002; Retrieved on Aug. 27, 2007] Retrieved from the Internet <URL: http://web.archive.org/web/20020618144127/http://bitworking.org/Aggie.html> and 7 pages of screen shots demonstrating Aggie (version 1.0, Release Candidate 3) (from Examiner in U.S. Appl. No. 11/105,810).

Biesinger, C., "How Mozilla Determines MIME Types," developer.mozilla.org, published Mar. 7, 2005 [online] [Retrieved on Feb. 2, 2007] Retrieved from the Internet<URL:http://developer.mozilla.org/en/docs/How_Mozilla_determines_MIME_Types>.

"Important Change to the LINK Tag[Dive into Mark]," http:diveintomark.org, published Jun. 2, 2002, [online] [Retrieved Jan. 31, 2007] Retrieved from the Internet<URL:http://diveintomark.org/archives/2002/06/02/important_change_to_the_link_tag>.

"Microsoft Team RSS Blog: Windows RSS Publisher's Guide (work-in-progress)," blogs.msdn.com, published Aug. 11, 2006, [online] [Retrieved on Jan. 31, 2007] Retrieved from the Internet<URL:http://blogs.msdn.com/rssteam/articles/PublishersGuide.aspx>.

"MIME Type Detection in Internet Explorer," msdn.microsoft.com, 2007, [online] [Retrieved on Feb. 2, 2007] Retrieved from the Internet<URL:http://msdn.microsoft.com/workshop/networking/moniker/overview/...>.

Newzcrawler, Generated through the execution of version 1.5.2 of a news aggregator/browser application called Newzcrawler on a PC running Windows XP. Application retrieved on Sep. 25, 2003, [online] Retrieved from the Internet <URL:http://www.filesearching.com/cgibin/s?t=n&I=en&q=ftp.sanet.sk/u0/tucows/windows/files4/newzcrawler15.zip> (from Examiner in U.S. Appl. No. 11/105,810).

Newzcrawler, README file accompanying the ZIP archive of the Newzcrawler application, Version 1.5.2 build 1738, Sep. 25, 2003, [online] Retrieved from the Internet <URL: http://www.filesearching.com/cgibin/s?t=n&I=en&q=ftp.sanet.sk/u0/tucows/windows/files4/newzcrawler15.zip>.

Newzcrawler, "Version History," last updated Nov. 27, 2007, [online] Retrieved from the Internet<URL:http://www.newzcrawler.com/whatnew_beta.txt>.

Newzcrawler, Archive of "Newzcrawler—web news reader & browser," [online] [Archived by http://archive.org on Nov. 4, 2002; Retrieved on Mar. 31, 2008] Retrieved from the Internet<URL:http://web.archive.org/web/20021104220828/http://www.newzcrawler.com/>.

"RSS Autodiscovery," rssboard.org, published Nov. 27, 2006, [online] [Retrieved on Jan. 31, 2007] Retrieved from the Internet<URL:http://www.rssboard.orgirss-autodiscovery>.

Archive of Gregorio, J., "How to Use Mime-Types to Get Your Aggregator To Subscribe To An Atom Feed," BitWorking, Dec. 6, 2003 [online] [Archived by http://archive.org on Dec. 28, 2003; Retrieved on Aug. 6, 2008] Retrieved from the Internet <URL: http://web.archive.org/web/20031228070846/http://bitworking.org/news/Atom_Auto_Sub_How_To>.

Zimmermann, B., "Atom MIME Type Woes," Feb. 7, 2004 [online][Retrieved on Aug. 6, 2008] Retrieved from the internet <URL: http://www.bernzilla.com/item.php?id=136>.

Pilgrim, M., "What is RSS?", [online], Dec. 18, 2002 [Retrieved on Sep. 29, 2005]. Retrieved from the Internet: <URL: http://www.xml.com/lpt/a/2002/12/18/dive-into-xml.html>.

Archive of Fritze, A., "Mozilla SVG Project," Last modified Jan. 10, 2002, [online] [Archived by http://archive.org on Feb. 7, 2002; Retrieved on Sep. 7, 2008] Retrieved from the Internet <URL: http://web.archive.org/web/20020207045701/http://www.mozilla.org/projects/svg/>.

FeedDemon, Generated through the execution of version 1.0 of an application named FeedDemon (dated Dec. 18, 2003). [online] Application downloaded from the Internet <URL: http://www.archive.org/details/tucows_352095_FeedDemon>. Series of 34 screen captures (Figures 1-34) and 19 pages comprising the associated Help files (from Examiner in U.S. Appl. No. 11/105,810).

Archive of Bradbury, N., "FeedDemon Help Files (various)," [online] [Archived by http://archive.org in 2003; Retrieved on Oct. 14, 2008] Retrieved from the Internet <URL: http://web.archive.org/web/2003*/http://www.bradsoft.com/feeddemon/help/1.0/*>. 16 pages.

FeedDemon, Generated through the execution of version 1.0 of an application named FeedDemon (dated Dec. 18, 2003). [online] Application downloaded from the Internet <URL: http://www.archive.org/details/tucows_352095_FeedDemon> (Figures 3A, 3B, and 34A-D) (from Examiner in U.S. Appl. No. 11/390,689).

NewsGator, Generated through the execution of version 1.1.0.7 of an application named NewsGator (dated 2003). [online] Application downloaded from the Internet <URL: http://web.archive.org/web/20030402083440/www.newsgator.com/downloads.aspx > (Figures 35-46) (from Examiner in U.S. Appl. No. 11/390,689).

Nottingham, M., "What is an RSS Channel, Anyway?" Nov. 25, 2002, 7 pages [online] [Retrieved on Mar. 26, 2009] Retrieved from the Internet <URL: http://www.mnot.net/rss/channel.html>.

Reinacker & Associates, Inc., "NewsGator—Downloads" Apr. 2, 2003 [online] [Retrieved on Mar. 25, 2009] Retrieved from the Internet <URL: http://web.archive.org/web/20030402083440/www.newsgator.com/downloads.aspx>.

Reinacker & Associates, Inc., "NewsGator—What is NewsGator?" Apr. 10, 2003 [online] [Retrieved on Mar. 25, 2009] Retrieved from the Internet <URL: http://web.archive.org/web/20030410220109/www.newsgator.com>.

News on Feeds, "NewsOnFeeds.com—List of News Aggregators", 9 pages, [online] [Retrieved on Jan. 19, 2010] Retrieved from the internet <URL: http://www.newsonfeeds.com/faq/aggregators>.

Omniweb, Generated through the execution of version 5.0 of a web browser application named Omniweb (released circa Aug. 11, 2004). Series of 8 screen dumps illustrating features (from Examiner in U.S. Appl. No. 11/390,689).

UniSA (University of South Australia) Information Strategy and Technology Services, "How to subscribe to a RSS feed in Internet Explorer 7", Jul. 15, 2009, 4 Pages [online] [Retrieved on Jan. 19, 2010] Retrieved from the internet <URL: http://www.unisa.edu.au/ISTS/ITHelpDesk/FAQS/Applications/IE7/FAQ/IE7_faq17.asp>.

Archive of "Chapter 6: Basic HTML data types" from HTML 4.01 Specification, 10 Pages, [online] [Archived by http://archive.org on Jan. 1, 2005; Retrieved on Jan. 29, 2010] Retrieved from the internet <URL: http://web.archive.org/web/20050101023541/www.w3.org/TR/REC-htm140/types.html>.

Archive of "Chapter 12: Links in HTML documents" from HTML 4.01 Specification, 11 Pages [online] [Archived by http://archive.org on Jan. 1, 2005; Retrieved on Jan. 29, 2010] Retrieved from the internet <URL: http://web.archive.org/web/20050101085121/http://www.w3.org/TR/REC-htm140/struct/links.html>.

PulpFiction, Generated through the execution of version 1.2.1 of an RSS feed reader application named PulpFiction (released circa Feb. 3, 2005), Freshly Squeezed Software, Copyright 2004. [online] Application downloaded from the Internet, [Archived by http://archive.org on Feb. 3, 2005; Retrieved on Jan. 13, 2010] Retrieved from the internet <URL: http://web.archive.org/web/*/http://www.freshlysqueezedsoftware.com/>. 7 screen dumps labeled pp. 1-7 & Help file which is 62 pages total (from Examiner in U.S. Appl. No. 11/390,689).

Awasu, Generated through the execution of version 2.1 of an RSS feed reader application named Awasu (released circa Jan. 23, 2005). [online] Application downloaded from the Internet, [Retrieved on Jan. 16, 2010] Retrieved from the internet <URL: http://web.archive.org/web/*/http://www.awasu.com>. 3 screen dumps illustrating features including portion of online help file (from Examiner in U.S. Appl. No. 11/390,689).

Office Action for U.S. Appl. No. 11/390,588, Feb. 2, 2010, 16 pages.

\* cited by examiner

Apple Hot News

Mac OS X: Best Unix Desktop Thursday, 12:00 AM
Steven J. Vaughan-Nichols writes for eWeek, "GNOME is nice, KDE is fine and the forthcoming Looking Glass may be derful, but the best Unix desktop is the one in the Macintosh." [Oct 14] Read more...

iTunes Music Store Downloads Top 150M Thursday, 12:00 AM
Music fans have purchased and downloaded more than 150 million songs from the iTunes Music Store, marking another major milestone for the online music business. iTunes users are now downloading more than 4 million songs per week, a rate of over 200 million songs per year. [Oct 14] Read more...

New "Mini" Retail Store Design Thursday, 12:00 AM
Apple unveiled its new "mini" retail store, an all-new design featuring stainless steel walls and seamless white floors and ings. Half the size of Apple's smallest store to date, the mini store fits in a variety of new locations to introduce Apple products to even more customers. The first six mini stores open Saturday at 10 a.m. in Palo Alto; San Jose; Santa Rosa, CA; Tukwila, WA; Bridgewater, NJ; and Rockaway, NJ. [Oct 14] Read more...

Apple Reports Fourth Quarter Results Wednesday, 12:00 AM
For its fiscal 2004 fourth quarter, Apple posted a net profit of $106 million, or $.26 per diluted share. These results compare to a profit of $44 million, or $.12 per share, a year ago. Revenue for the quarter was $2.35 billion, up 37% from a year ago. Gross margin was 27%, up from 26.6% last year. International sales accounted for 37% of revenue. [Oct 13] Read more...

New "Star Wars Trilogy" Shines on DVD Oct 8, 12:00 AM
The re-mastering of the "Star Wars Trilogy" involved epic wrangling of badly degraded master prints by film restoration expert John Lowry of Lowry Digital Images. [Oct 08] Read more...

Murch Using Final Cut Pro HD for "Jarhead" Oct 6, 12:00 AM
For Hollywood Reporter, Sheigh Crabtree writes that Oscar-winning editor Walter Murch "will reteam his key editing crew from 'Cold Mountain' and again use Apple's Final Cut Pro system, but in high definition" for the editing of Universal Pictures' upcoming Gulf War drama "Jarhead." [Oct 06] Read more...

iMac G5: "Marvel on the Inside, too" Oct 5, 12:00 AM
"The new G5 iMac is the finest personal computer I've ever used, hands down," writes Mike Wendland for the Detroit Free Press. "Nothing comes close. If you have ever thought of switching from a Windows-based PC to a 13 Total

Search Articles:

Article Length:

Sort By:
Date
Title
Source

Recent Articles:
All
Today
Yesterday
Last Seven Days
This Month
Last Month

Source:
Apple Hot News

Actions:
Mail Link to This Page

FIG. 4A

RSS Feeds

453 New, 1305 Total

Search Articles:

Article Length:

Sort By:
Date
Title
Source
New

Recent Articles:
All
Today
Yesterday
Last Seven Days
This Month
Last Month

RSS Feeds:
All
ABC News: Sports
ABC News: Business
ABC News: Entertai...
ABC News: Techno...
ABC News: Travel
ABC News: US
Apple Hot News
Apple Press Relea...
baltimoresun.com tr...
BBC News | News...
BBC News | Busin...
BBC News | Enterta...
BBC News | Techn...
MarketWatch.com
CNET News.com
CNET News.com-...
CNET News.com
SI.com

Report: Ad spending in gay media soared in 2004 Today, 07:06 PM
CHICAGO (MarketWatch) -- Corporate America stepped up its attempts to woo gay and lesbian customers in 2004, according to an ad spending study released Tuesday. Read more...

Harris: More hawkish about Inflation Today, 07:01 PM
WASHINGTON (MarketWatch) -- The Federal Reserve's policy statement Tuesday signals a "turn in Fed Terminology," and acknowledgement that inflation is becoming an issue, said Ethan Harris, chief economist at Lehman Bros. Read more...

Oracle shares fall in late trade after earnings Today, 06:58 PM
SAN FRANCISCO (MarketWatch) -- Shares of Oracle Corp. dipped more than 1 percent after the bell Tuesday as the world's No. 2 software company reported its third-quarter net income slipped 15 percent. Read more...

U.S. to Face Mexico in Soccer Qualifier Today, 06:53 PM
United States Looks to Claim No. 1 Regional Ranking in World Cup Qualifier Against Mexico Read more...

Children Abducted in Atlanta Found Safe Today, 06:47 PM
Two Children Abducted From Suburban Atlanta Home Found Safe; Suspect Surrenders Read more...

Schiavo's Parents File New Appeal Today, 06:47 PM
Schiavo's Parents File New Appeal Urging Court to Reconnect Tube; Justice Dept. Urges Injunction Read more...

Oracle Q3 net falls 15% to $540 min Today, 06:46 PM
SAN FRANCISCO (MarketWatch) - Oracle Corp. reported late Tuesday fiscal third-quarter net income fell 15 percent, even as sales rose, as the largest seller of database software had higher costs related to its $10.5 billion acquisition of smaller rival PeopleSoft. Read more...

Fehr: Exposure Key in Ending Steroid Use Today, 06:41 PM
Donald Fehr Says He Thinks Public Exposure of Steroid Users Will Be Most Important Deterrent Read more...

Comedian Testifies in Jackson Trial Today, 06:41 PM

FIG. 4B

RSS Feeds

Children Abducted in Atlanta Found Safe Today, 06:47 PM
Two Children Abducted From Suburban Atlanta Home Found Safe; Suspect Surrenders Read more...

Schiavo's Parents File New Appeal Today, 06:47 PM
Schiavo's Parents File New Appeal Urging Court to Reconnect Tube; Justice Dept. Urges Injunction Read more...

Oracle Q3 net falls 15% to $540 min Today, 06:46 PM
SAN FRANCISCO (MarketWatch) - Oracle Corp. reported late Tuesday fiscal third-quarter net income fell 15 percent, even as sales rose, as the largest seller of database software had higher costs related to its $10.5 billion acquisition of smaller rival PeopleSoft. Read more...

Fehr: Exposure Key in Ending Steroid Use Today, 06:41 PM
Donald Fehr Says He Thinks Public Exposure of Steroid Users Will Be Most Important Deterrent Read more...

Comedian Testifies in Jackson Trial Today, 06:41 PM
Comedian Recounts Frightened Call From Michael Jackson Accuser's Mother Read more...

Compuware and IBM Settle, Ending Trial Today, 06:41 PM
Compuware and IBM Settle on Alleged Theft of Intellectual Property, End Federal Trial Read more...

Orioles' DuBose Charged With Drunk Driving Today, 06:39 PM
Baltimore Orioles' Eric DuBose Is Arrested in Florida, Charged With Drunken Driving Read more...

France Abolishing Its 35-Hour Workweek Today, 06:30 PM
French Lawmakers Abolish 35-Hour Workweek, Allowing Employers to Increase Working Hours, Pay Read more...

Police: Teen Gunman Stole Gunbelt, Vest Today, 06:30 PM
Gunmen in Minn. Killing Spree Stole Gunbelt, Bulletproof Vest After Killing Grandfather, Police Say Read more...

453 New, 1305 Total

Last Month

RSS Feeds:
All
ABC News: Sports
ABC News: Business
ABC News: Entertai...
ABC News: Techno...
ABC News: Travel
ABC News: US
Apple Hot News
Apple Press Relea...
baltimoresun.com tr...
BBC News | News...
BBC News | Busine...
BBC News | Enterta...
BBC News | Techn...
MarketWatch.com...
CNET News.com
CNET News.com—...
CNET News.com
SI.com
CNN.com
CNN.com - U.S.
CNN/Money
ESPN.com
rssnewsapps.ziffda...
rssnewsapps.ziffda...
Fast Company
HowStuffWorks.com
Inc.com
Inside Mac Games
iTunes 25 Featured...
iTunes 25 Just Add...
iTunes 25 New Rel...
iTunes Top 25 Albu...
iTunes Top 25 Songs
Mac OS X Downloads
Mac OS X Hot Dow...
Apple Support - Mo...
MacCentral News
Macworld Reviews

FIG. 4C

RSS Feeds

453 New, 1305 Total

EU lets members increase spending Today, 12:00 PM
EU leaders approve changes to the rules that govern the euro, giving governments greater freedom to boost spending in time of economic downturn. Read more...

EU lets members increase spending Today, 12:00 PM
EU leaders approve changes to the rules that govern the euro, giving governments greater freedom to boost spending in time of economic downturn. Read more...

PalmOne CTO eyeing new horizions Today, 12:00 PM
Null Read more...

Apple swallows SchemaSoft Today, 11:58 AM
The Mac maker says it has purchased the assets of SchemaSoft, which helps software makers translate rival file formats. Read more...

Apple swallows SchemaSoft Today, 11:58 AM
The Mac maker says it has purchased the assets of SchemaSoft, which helps software makers translate rival file formats. Read more...

Cards GM Jocketty apologizes to Helton, Roc... Associated Press Today, 11:52 AM
Jocketty apologizes on behalf of Cards organization by Associated Press Read more...

Microsoft seeks rehearing in Eolas case Today, 11:44 AM
Redmond seeks ruling on the "golden master" issue. Results could have a dramatic effect on how software is distributed worldwide. Read more...

Indiana keeps Davis but tells him to win more Today, 11:42 AM
Associated Press
School expects better team than 15-14 by Associated Press Read more...

Red Herring
RollingStone.com...
RollingStone.com...
Slashdot
The Motley Fool
NYT > Sports
NYT > Home Page
NYT > Books
NYT > Business
NYT > Circuits
NYT > Dining and...
NYT > Fashion and A...
NYT > Media and A...
NYT > Movie Reviews
NYT > National
NYT > Technology
NYT > Travel
TIME Magazine Onl...
TIME Magazine Onl...
TIME Magazine Onl...
VersionTracker: Ma...
washingtonpost.co...
washingtonpost.co...
washingtonpost.co...
washingtonpost.co...
Wired News: Techn...
Wired News: Top St...
Wired News: Busin...
Wired News: Cult of...
Yahoo! News: Top ...
Yahoo! News: Sports...
Yahoo! News: Bus...
Yahoo! News: Ente...
Yahoo! News: Tech...
Yahoo! News: U.S. ...

Actions:
Mail Link to This Page

PLATFORM FOR FEEDS

CROSS-REFERENCE TO RELATED APPLICATIONS

This application is a continuation of the following patent application, which is hereby incorporated by reference: U.S. application Ser. No. 11/105,637, filed on Apr. 13, 2005, entitled "News Feed Browser." This patent application is related to the following patent applications, which are hereby incorporated by reference: U.S. patent application Ser. No. 09/467,073, filed on Dec. 20, 1999, entitled "Secondary Windows Generated as Document-Modal Overlays"; U.S. patent application Ser. No. 10/951,915, filed on Sep. 27, 2004, entitled "Live Content Resizing"; U.S. patent application Ser. No. 11/105,771, filed on Apr. 13, 2005, entitled "Multiple-Panel Scrolling"; U.S. patent application Ser. No. 11/105,810, filed on Apr. 13, 2005, entitled "News Feed Viewer"; U.S. patent application Ser. No. 11/371,311, filed on Mar. 7, 2006, entitled "MIME Type Detection for Feeds"; and U.S. patent application Ser. No. 11/371,153, filed on Mar. 7, 2006, entitled "Bookmarks and Subscriptions for Feeds".

FIELD OF THE INVENTION

The present invention relates generally to software tools for accessing a news feed, and more particularly to software tools for detecting, displaying, and managing a news feed.

BACKGROUND OF THE INVENTION

Many users turn to the Internet as a source of news. Millions of web pages are available as a source of news content. These web pages take many forms, including, for example, articles, blurbs, and web logs ("blogs"), among others. In general, news content is published by inserting it into a web page (e.g., coding it into a HyperText Markup Language (HTML) file), which can then be viewed using a web browser.

However, there are drawbacks to this approach. Users who wish to see content from a variety of sources must typically visit many different web sites. In addition, if the user later wants to obtain the most current content from all the sources, she must visit all the different web sites again. This is very time consuming, especially if the user is interested in many different types of content and/or sources.

One possible solution is a software application that automatically visits a number of web sites that provide news content. The application analyzes the content found at each of the web sites, determines whether the content has changed, and notifies the user as to such changes. The user can then visit the web sites having newly-updated content. Alternatively, the application can automatically extract the updated content and present directly to the user. Unfortunately, in many cases it is very difficult (if not impossible) to identify the news content of a web page without a priori knowledge of the structure of the web page.

In response, "feeds" have been developed as a way to publish news content in a structured format that facilitates identification and analysis. A feed (also known as a "news feed" or "blog feed") can contain articles (content items), meta-data about the articles (e.g., title, date, and author), and/or meta-data about the feed itself (e.g., title, URL, and last-updated timestamp). Some feeds are described by Resource Description Framework (RDF) statements and/or encoded using eXtended Markup Language (XML) (such as, e.g., the XML syntax RDF/XML). These features of feeds make it easier for applications to automatically collect and evaluate news content for presentation to the user.

The term "syndication XML" refers to XML that has been developed for feeds, such as Atom and RSS ("Really Simple Syndication," "Rich Site Summary," or "RDF Site Summary"). Since the general structure of a feed is known, it is possible to identify the news content within it. Software applications have been developed that work with content published using syndication XML.

One feature of such applications enables a user to view the content of a feed in a way that is more user-friendly than a raw XML (text) file. (Syndication XML identifies content, without requiring that the content be displayed in any particular way.) Applications and/or application handlers, commonly known as "feed viewers," "feed readers," or "feed aggregators," are capable of reading the syndication XML and presenting it to the user. These applications, which can be implemented as (for example) stand-alone applications or web browser plug-ins, often contain useful user interface controls for facilitating navigation, searching, and the like with respect to news feeds. Another feature of many such feed viewers is "aggregation," which enables a user to specify multiple feeds and integrate their content into a single feed.

While feeds have made it easier to access news content, existing techniques for detecting, managing, and presenting news feeds have some disadvantages. One problem is that users may be unable to determine whether a server is publishing a feed. Then, once a feed has been found and navigated to, the web browser will often prompt the user to save the feed to disk or display it as raw text, rather than display it in a user-friendly way. Another problem is that even if a feed can be displayed in a user-friendly way, this display often cannot be modified based on user preferences. Yet another problem is that if a user views a feed using multiple feed viewers (for example, on different computers), the state of the user's interaction with the feed (for example, which articles have been read) is inconsistent across the viewers. One viewer is not aware of the fact that the user has already viewed a particular article in another viewer. What is needed is a software application and/or software architecture that solves these problems.

SUMMARY OF THE INVENTION

The present invention provides techniques for detecting, managing, and presenting syndication XML (news feeds). In one embodiment, a web browser automatically determines that a web site is publishing syndication XML and notifies the user. The user is then able to access the feed easily. The user can be notified, for example, by displaying a badge in the address bar of the browser window. The user can access the feed, for example, by using the badge to toggle between viewing the web page and viewing the feed.

In another embodiment, a web browser automatically determines that a web page or feed is advertising relationship XML. The web browser then determines that the relationship XML identifies a feed or web page. The user is then able to access the identified feed or web page easily. In one embodiment, when relationship XML is found, information about the people identified in the relationship XML is displayed. For example, a person's name can be displayed and can link to her syndication XML or to her homepage.

In yet another embodiment, a web browser automatically determines whether a file contains syndication XML. If it does, the web browser enables the user to view the feed in a user-friendly way. For example, the web browser can open the feed file in an application handler to display the feed. As another example, the web browser can display the feed in its content window. In one embodiment, the web browser converts the feed to HTML and then displays the HTML.

In yet another embodiment, a user can bookmark feeds and organize the bookmarks using folders. In one embodiment, a user can aggregate multiple feeds by selecting a folder containing multiple feed bookmarks. In one embodiment, a bookmark displays the number of "read" or "unread" items in its associate feed. A user can also subscribe to feeds.

In yet another embodiment, a user can modify how a feed is displayed. For example, the user can specify which content is to be displayed. In one embodiment, the user can control the order in which articles are displayed. In another embodiment, the user can specify which articles are to be displayed. In yet another embodiment, the user can control the amount of each article that is displayed. As another example, a user can modify the format in which a feed is displayed. A format can specify which information is displayed (and in what order) and how the displayed information should be formatted. In one embodiment, a modification regarding how a feed is to be displayed is stored so that it can be used again at a later time.

In yet another embodiment, feed state information is stored in a repository that is accessible by applications that might be used to view the feed. In one embodiment, if the state of a feed changes, an application notifies the repository, and the repository updates the state accordingly. In another embodiment, a feed is parsed and stored in a structured way.

In yet another embodiment, a user can create a custom feed through aggregation and/or filtering of existing feeds. Aggregation includes, for example, merging the articles of multiple feeds to form a new feed. Filtering includes, for example, selecting a subset of articles of a feed based on whether they satisfy a search query. Aggregation and/or filtering can be performed server-side or client-side.

In yet another embodiment, a user can find articles from feeds that she has not bookmarked or subscribed to. The user can enter a search query into a search engine that searches feeds, which will identify one or more feed articles that satisfy the query. Once the articles that satisfy the query have been identified, the search engine returns the results. In one embodiment, the results are presented to the user in the form of a web page containing one or more links to feed articles. In another embodiment, the articles that satisfy the query are assembled into a feed, which is then presented to the user.

BRIEF DESCRIPTION OF THE DRAWINGS

The accompanying drawings illustrate several embodiments of the invention and, together with the description, serve to explain the principles of the invention.

FIG. 4A is a screen shot depicting an example of a browser window, where the browser window is displaying a feed and user interface elements for controlling how the feed is displayed.

FIG. 4B is a screen shot depicting an example of a browser window, where the browser window is displaying an aggregate feed and user interface elements for controlling how the feed is displayed.

FIG. 4C is a screen shot depicting the browser window of FIG. 4B, where the browser window has been scrolled down to display different articles.

FIG. 4E is a screen shot depicting the browser window of FIG. 4D, where the browser window has been scrolled down to display different articles.

Figure 1A:
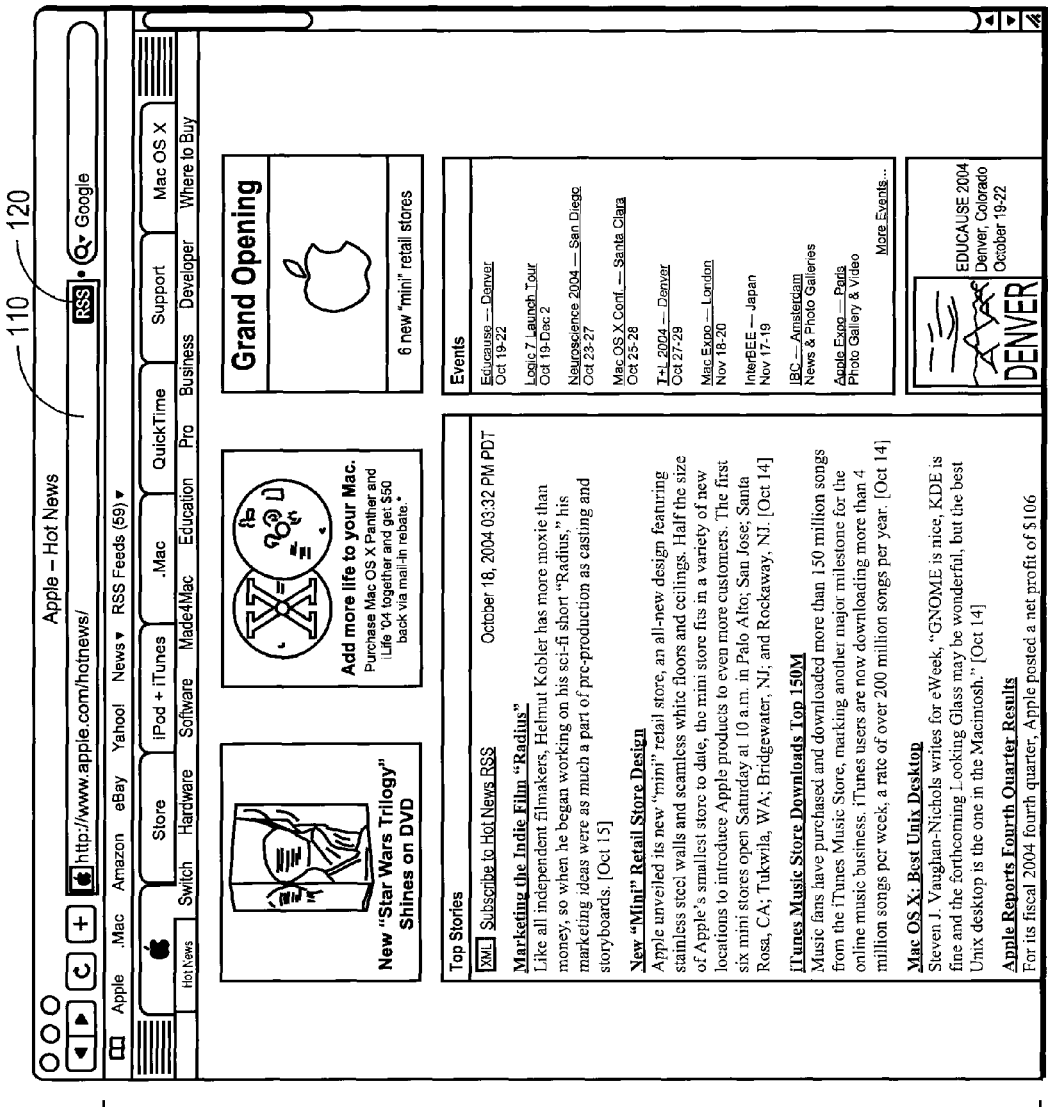
FIG. 1A is a screen shot depicting an example of a browser window, where the browser window is displaying a web page and the URL address bar includes a badge.

One skilled in the art will recognize that these Figures are merely examples of the operation of the invention according to one embodiment and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention can be embodied in many different forms and should not be construed as limited to the embodiments set forth herein. Rather, these embodiments are provided so that this disclosure will be complete and will fully convey the invention to those skilled in the art.

For illustrative purposes, the invention is described in connection with a mechanism for interacting with news feeds. Various specific details are set forth herein and in the Figures, to aid in understanding the present invention. However, such specific details are intended to be illustrative, and are not intended to restrict in any way the scope of the present invention as claimed herein. In addition, the particular screen layouts, appearance, and terminology as depicted and described herein are intended to be illustrative and exemplary and in no way limit the scope of the invention as claimed.

In one embodiment, the present invention is implemented in a conventional personal computer system, such as an iMac, Power Mac, or PowerBook (available from Apple Computer, Inc. of Cupertino, Calif.), running an operating system such as Mac OS X (also available from Apple Computer, Inc.). It will be recognized that the invention can be implemented on other devices as well, such as handhelds, personal digital assistants (PDAs), mobile telephones, consumer electronics devices, and the like. The invention can be embodied in software that runs on the personal computer. The invention can be included as add-on software, or it can form part of the operating system itself, or it can be a feature of an application that is bundled with the computer system or sold separately. The various features of the invention as described herein include output presented on a display screen that is connected to the personal computer. In addition, the invention makes use of input provided to the computer-system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device.

In the following description, the terms "news feed," "blog feed," and "feed" are used interchangeably to refer to articles (content items), meta-data about articles (e.g., title, date, and author), and meta-data about feeds (e.g., title, URL, and last-updated timestamp). A feed can be described by Resource Description Framework (RDF) statements and/or encoded using eXtended Markup Language (XML) (such as, e.g., the XML syntax RDF/XML). The term "syndication XML" refers to XML that has been developed for feeds, such as Atom and RSS ("Really Simple Syndication," "Rich Site Summary," or "RDF Site Summary"). The terms "feed viewer" and "feed reader" are used interchangeably to refer to a software component that enables a user to view a feed. A feed viewer can be, for example, a web browser plug-in or a standalone application. For the purposes of this application, the phrase "feed browser" refers to a feed viewer that can also be used to browse the web (e.g., to display files containing HTML). Although a feed viewer is usually located on a user's computer (e.g., as a web browser), it can also be located on a remote computer (e.g., as a remote application accessed using a terminal).

Detecting the Availability of a Feed

As described above, existing news feed viewers have several disadvantages. One problem is that users are unable to determine, via a conventional feed viewer, whether a server is publishing a feed. Some feeds are published in conjunction with web sites. Web sites that offer their content as feeds (e.g., in addition to HTML) can inform users of the existence of these feeds by, for example, displaying on a web page the feed's address or a link to it. However, not all web sites with feeds advertise them to users. And, even if they do, users may not see the advertisements if the advertisements are scarce and/or buried within large web pages.

In one embodiment of the present invention, a web browser automatically determines that a web site is publishing a feed and notifies the user. The user is then able to access the feed easily. The user can be notified, for example, by displaying a badge 120 in the Uniform Resource Locator (URL) address bar 110 of the browser window 100. The user can access the feed, for example, by using the badge 120 to toggle between viewing the web page and viewing the feed. One skilled in the art will recognize that in other embodiments of the present invention, other techniques can be used to notify the user of the existence of a feed and to enable the user to easily access the feed.

Figure 1B:
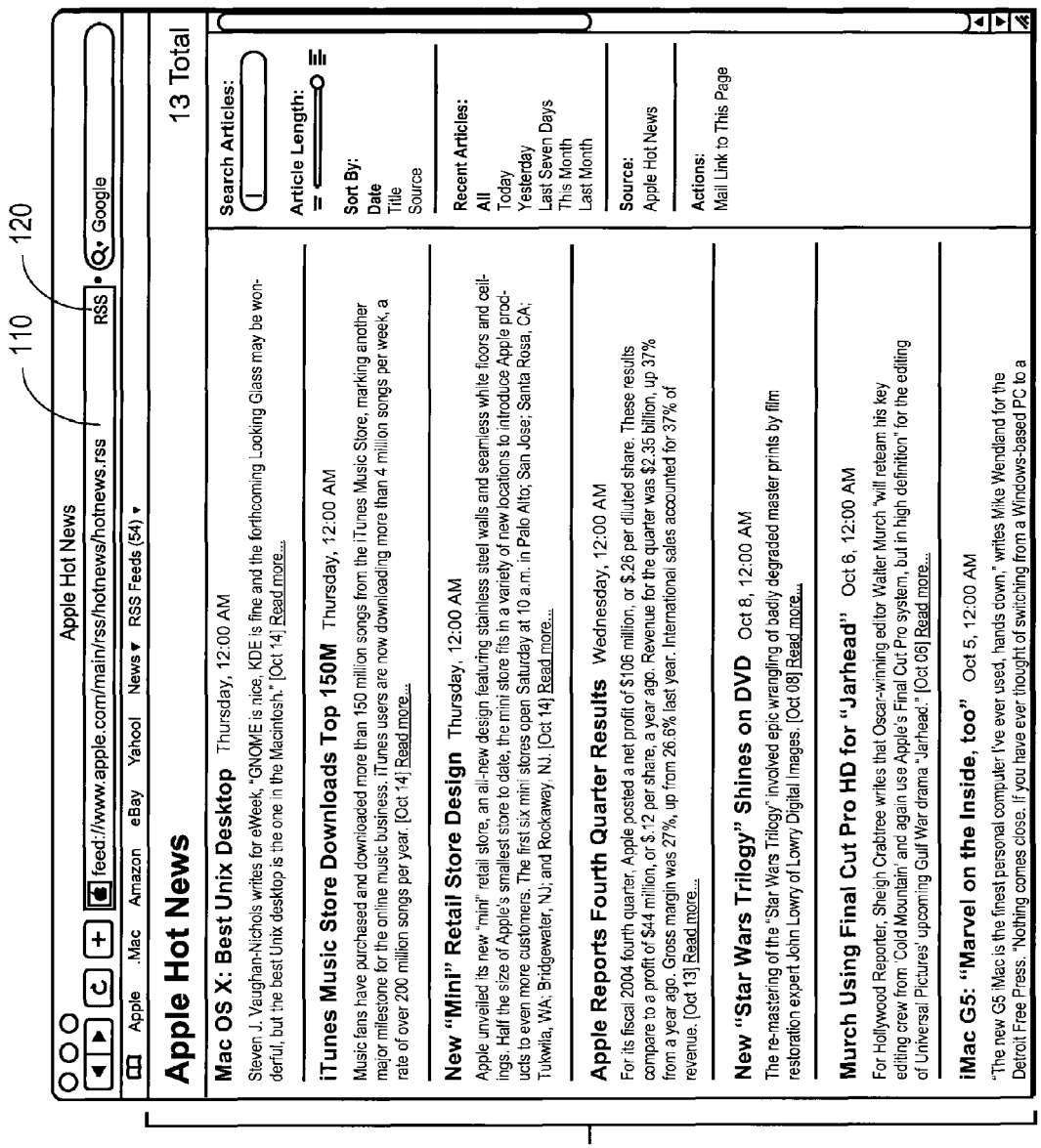
FIG. 1B is a screen shot depicting an example of a browser window, where the browser window is displaying a feed and the URL address bar includes an RSS badge.

FIG. 1A is a screen shot depicting an example of a browser window, where the browser window is displaying a web page and the URL address bar includes a badge. In the illustrated embodiment, the badge 120 includes the letters "RSS". If the user toggles the view (e.g., by clicking on the badge 120), the feed browser window 100 displays the feed instead of the web page. FIG. 1B is a screen shot depicting an example of a browser window, where the browser window is displaying a feed and the URL address bar includes an RSS badge. Note that in the illustrated embodiment, the appearance of the badge 120 has changed. This change in appearance indicates that a feed is being displayed and that an associated web page exists. If the user again toggles the view (e.g., by clicking on the badge 120), the browser window 100 displays the associated web page instead of the feed.

In one embodiment, when the feed browser toggles from displaying a web page to displaying a feed, a distinctive visual effect or animation is presented to reinforce the transition between the two modes. For example, in one embodiment, a window-shade effect is used, in which the feed appears to "roll down" over the web page, obscuring it. Similarly, when the browser toggles from displaying a feed to displaying a web page, the feed appears to "roll up" and expose the underlying web page. This behavior is described in the following patent application, which is hereby incorporated by reference: U.S. patent application Ser. No. 09/467,073, filed on Dec. 20, 1999, entitled "Secondary Windows Generated as Document-Modal Overlays."

In one embodiment of the present invention, the web browser automatically determines whether a website is publishing a feed. Many different techniques can be used to make this determination. For example, the web browser can determine whether a web site is publishing a feed by determining whether the HyperText Markup Language (HTML) code of the web page contains a <link> element that refers to a feed. This <link> element can indicate the URL of the feed and its content type. For example, <link rel="alternate" type="application/rss+xml" href="http://www.apple.com/main/rss/hotnews/hotnews.rss"> indicates that an alternate link for the web page is a feed located at http://www.apple.com/main/rss/hotnews/hotnews.rss that has a content type of application/rss+xml.

Other online resources besides websites can also advertise feeds. Feeds can be advertised, for example, by "relationship XML." The term "relationship XML" refers to XML that has been developed to describe people, such as Friend-of-a-Friend (FOAF) and XFN (XHTML Friends Network). Relationship XML uses XML and RDF to publish information about people, the relationships between them, and the things that they create or do. This information can include, for example, name, email address, homepage, syndication XML feed, and acquaintances ("friends"). Using relationship XML to provide a link to a person's feed enables a user to traverse a web of interconnected people who are all publishing feeds.

Web sites that publish relationship XML can advertise this information to users by, for example, displaying on a web page the relationship XML's address or a link to it. However, not all web sites with relationship XML advertise it to users. And, even if they do, users may not see the advertisements if the advertisements are scarce and/or buried within large web pages.

In one embodiment, a web browser automatically determines that a web page is publishing relationship XML. The browser determines whether the relationship XML identifies a feed (or web page). If it does, the browser notifies the user. The user is then able to access the identified feed (or web page) easily. The user can be notified, for example, by displaying a link in the content window of the browser window 100. The user can access the identified feed or web page by, for example, using the link. In one embodiment, such a methodology is enabled by modifying the web page that publishes the relationship XML to include the link.

Feeds can also advertise relationship XML. In one embodiment, a feed viewer determines that a feed is advertising relationship XML. The viewer determines whether the relationship XML identifies a feed (or web page). If it does, the browser notifies the user, and the user is able to access the identified feed (or web page) easily. The user can be notified, for example, by displaying a link in the feed viewer (in addition to displaying the original feed that advertised the relationship XML). The user can access the identified feed or web page by, for example, using the link. In one embodiment, the feed that advertises the relationship XML is modified to include the link.

In one embodiment, when relationship XML is found, a feed viewer or feed browser displays the names (e.g., identified in a <foaf:name> block) of people identified as acquaintances in the relationship XML (e.g., identified in a <foaf:knows> block). An acquaintance name can be linked to the acquaintance's syndication XML feed (e.g., identified in a <foaf:weblog> block) or homepage (e.g., identified in a <foaf:homepage> block; for example, if no such feed exists). In one embodiment, an acquaintance's syndication XML feed can be identified by reviewing the acquaintance's relationship XML (e.g., identified in a <foaf:seeAlso> block) or by reviewing the acquaintance's homepage, which might advertise the feed. These acquaintance name links can be used to traverse a web of interconnected people who are publishing feeds and/or web pages.

Figure 5:
FIG. 5 is a screen shot depicting an example of a browser window, where the browser window is displaying a feed and relationship XML.

FIG. 5 is a screen shot depicting an example of a browser window, where the browser window is displaying a feed and relationship XML. In the illustrated embodiment, feed browser window 100 includes a feed panel 400 and a user interface element panel 410. The user interface element panel 410 includes a list 500 of names of people identified as acquaintances in the relationship XML. If a user selects a name from this list 500 (e.g., by clicking on it or issuing a voice command), the browser window 100 displays the feed or homepage (not shown) associated with that name.

In one embodiment, when relationship XML is found, a feed viewer or feed browser displays information about the owner of the XML. This information is available from the XML and can include, for example, a picture of the person, her name, her contact information, and links to her feed and/or web page. In one embodiment, rather than displaying links to the person's feed and/or web page, the feed viewer or feed browser displays the actual feed and/or web page. In addition, if the feed or web page (or an alternate web page) advertises relationship XML, this relationship XML can also be displayed, as described above.

Information displayed about the owner of the XML can also include the names of people identified as acquaintances in the XML. In one embodiment, selecting an acquaintance name accesses that acquaintance's relationship XML and displays the same types of information about the acquaintance (possibly including a related feed or web page, if one exists). In this way, a user can drill farther and farther down into a social network of friends (acquaintances) and friends-of-friends.

A web browser can determine whether a web page or feed is advertising relationship XML by, for example, determining whether the HyperText Markup Language (HTML) code of the web page (or the XML code of the feed) contains a <link> element that refers to relationship XML. This <link> element can indicate the URL of the relationship XML and its content type. For example, <link rel="meta" type="application/rdf+xml" title="FOAF" href="http://janedoe.typepad.com/foaf.rdf"/> indicates that a metadata link for the web page is a file located at http://janedoe.typepad.com/foaf.rdf that has a content type of application/rdf+xml.

Even if a feed does not advertise relationship XML, it might advertise an alternate (or parent) web page. Such an advertisement could be, for example:<link rel="alternate" type="text/html" href="http://janedoe.typepad.com/nameless/"/>. This alternate or parent web page might, in turn, advertise relationship XML, which can be used as described above.

Detecting that a File Contains a Feed

Once a user has found a feed and navigated to it, many existing web browsers will prompt her to save the feed to disk or will display it as raw text, rather than display it in a user-friendly way. Some existing browsers do this because they do not recognize that the requested file contains a feed.

In one embodiment, the web browser of the present invention avoids such undesirable behavior by automatically determining whether a file contains a feed and, if it does, using this information to enable the user to view the feed in a user-friendly way.

A web browser can determine whether a file contains a feed by, for example, analyzing the file's attributes. These attributes can include, for example, content type (also known as "Multipurpose Internet Mail Extension (MIME) type"), filename extension, and/or URL scheme, and can indicate that a file contains a feed. For example, a content type of text/rss+xml, application/rss+xml, text/atom+xml, or application/atom+xml, a filename extension of .rss or .atom, and/or a URL scheme of "feed" (so that a URL would begin with "feed://") usually indicate that the file contains a feed.

Sometimes the content type, filename extension, and/or URL scheme information is missing or inconsistent. For example, a file's content type might be missing, while its filename extension is .rss and its URL scheme is http. Files including feeds frequently have non-syndication XML content types (e.g., text/rdf+xml, application/rdf+xml, text/xml, application/xml, and text/plain), filename extensions (e.g., .rdf, .xml, and .txt), and/or URL schemes (e.g., http). In these situations, it is unclear whether the file includes syndication XML.

In one embodiment, the web browser of the present invention determines, based on the available information, whether the file includes syndication XML. Alternatively, it gathers more information before making this determination. For example, the web browser can analyze the file's contents (either the entire file or just a portion thereof) for syndication XML tags. These tags can include, e.g., <feed>, <rss>, and <atom>.

Figure 2:
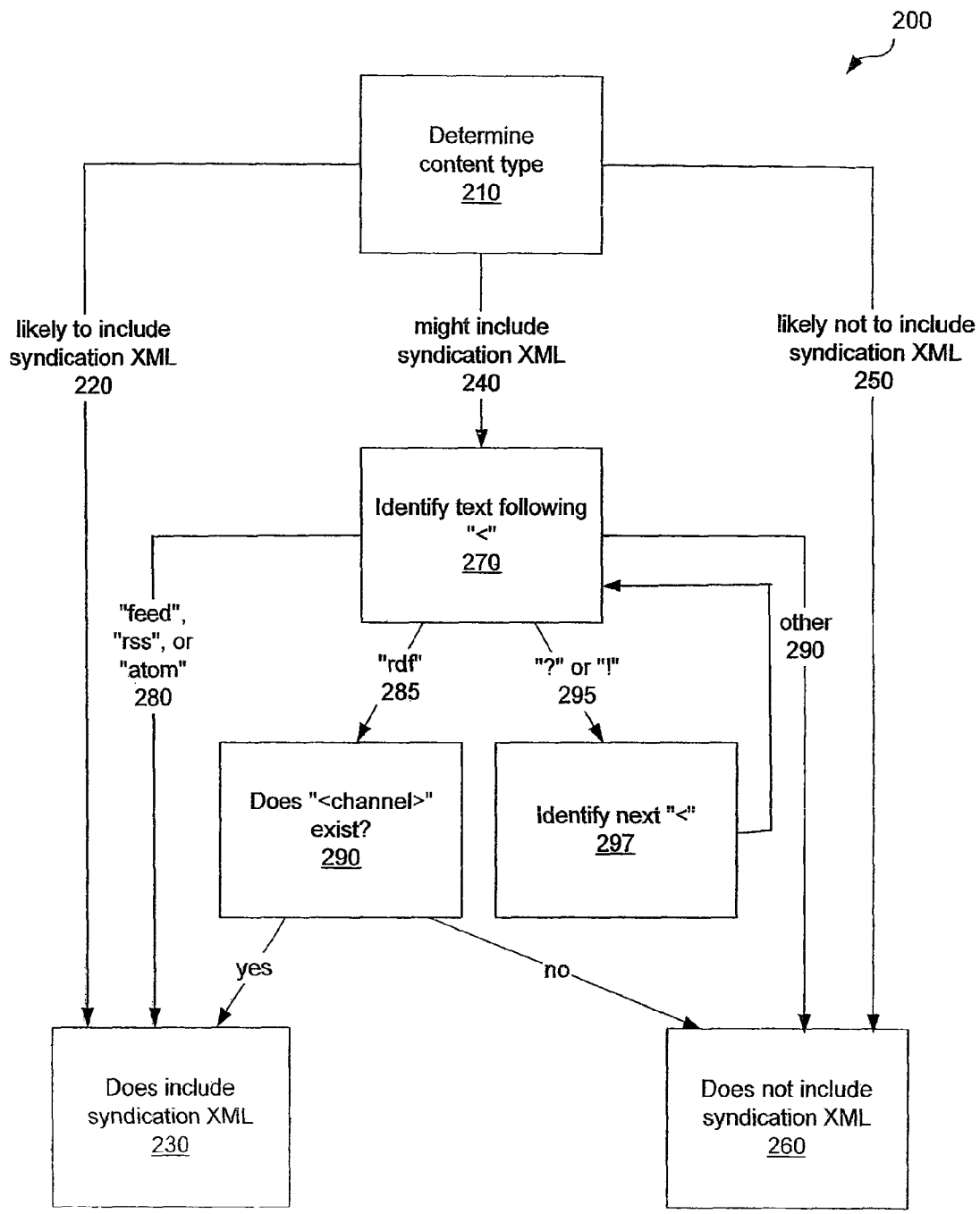
FIG. 2 is a flowchart depicting a method for determining whether a file includes syndication XML.

FIG. 2 is a flowchart depicting a method for determining whether a file includes syndication XML. Method 200 begins by determining 210 the file's content type. In one embodiment, this is accomplished using the URL Loading System set of classes and protocols in the Cocoa application environment (e.g., an NSURLResponse object), which is available from Apple Computer, Inc. If the content type indicates that the file is likely to include syndication XML 220 (e.g., if the content type is text/rss+xml, application/rss+xml, text/atom+xml, or application/atom+xml), then the file does include syndication XML 230. If the content type indicates that the file might include syndication XML 240 (e.g., if the content type is text/rdf+xml, application/rdf+xml, text/xml, application/xml, or text/plain), then the file might include syndication XML, and more information is gathered (step 270). If the content type indicates that the file is likely not to include syndication XML 250 (e.g., if the content type is something else), then the file does not include syndication XML 260.

If the file might include syndication XML 240, its content is analyzed 270. In one embodiment, the first "<" character in the file is identified. If "<" is followed by "feed", "rss", or "atom" 280, then the file includes syndication XML 230. If "<" is followed by "rdf" 285, then "<channel>" is searched 290 for. If "<channel>" exists, then the file includes syndication XML 230. If "<channel>" does not exist, then the file does not include syndication XML 260.

If the first "<" character is followed by "?" or "!" 295, then the next "<" character is identified 297 and the characters following it are considered. If "<" is followed by anything else, then the file does not include syndication XML 260.

Displaying a Feed

Once a web browser has determined that a file contains a feed (e.g., syndication XML), in one embodiment, it enables the user to view the feed in a user-friendly way. In one embodiment, this is accomplished by opening the feed file in an application handler (such as a feed viewer) to display the feed. The user then views the feed using the feed viewer. If multiple feed viewers are available, the browser determines which one to use.

In one embodiment, the web browser determines a feed viewer to use by analyzing the file's attributes. This is accomplished, for example, using the Launch Services API in the Carbon set of procedural APIs, which is available from Apple Computer, Inc. For example, the function LSCopyApplicationFor-MIMEType can be used to determine the feed viewer based on the file's content (MIME) type. Similarly, the function LSGetApplicationForInfo can be used to determine the feed viewer based on the file's filename extension and/or URL scheme.

In one embodiment, when a web browser has determined that a file includes syndication XML, it changes the file's content type to "application/rss+xml" or "application/atom+xml" (if necessary). In another embodiment, the browser "reroutes" the loading of the file by opening a URL that is similar to the original URL but that has a URL scheme of "feed" instead of "http." Changing a file's content type and/or URL scheme improves the results obtained by using the Launch Services API, since the API determines the appropriate feed viewer based on these characteristics.

Once the feed viewer has been determined, it is launched and passed the file's URL. In one embodiment, this is accomplished by sending the AppleEvent "GURL" (get URL) to the feed viewer.

In another embodiment, a browser enables a user to view a feed in a user-friendly way by displaying the feed in its content window. In this embodiment, a user need not be aware that she has requested a file that contains a feed. The browser will simply display the feed in a seamless fashion. For purposes of the description provided herein, a browser that can display a feed in its content window is referred to as a "feed browser," which is a type of feed viewer (since it enables a user to view a feed).

A browser can display a feed in its content window by, for example, generating a visual representation of the feed. For example, the browser can include code that takes a feed as input and generates a visual representation of it. The code can determine graphical user interface elements to display the feed (similar to code found in feed viewers). Alternatively, the code can convert a feed to HTML and then display the HTML using the browser. For example, the code can assemble an HTML file that includes articles, article meta-data, and feed meta-data. In one embodiment, the feed, the articles in the feed, or the resulting HTML file is checked for validity and well-formedness and is corrected if necessary (e.g., using HTML Tidy).

Obtaining New Feed Content

When a user finds an interesting feed, she may want to obtain new feed content as it is published. Conventionally, if the user does not know when publication occurs, she may have to repeatedly return and view the feed periodically to determine whether the content has changed.

In one embodiment, the present invention provides functionality that helps streamline and/or minimize such repeated manual viewings of the feed. A user can bookmark a feed.

Figure 3A:
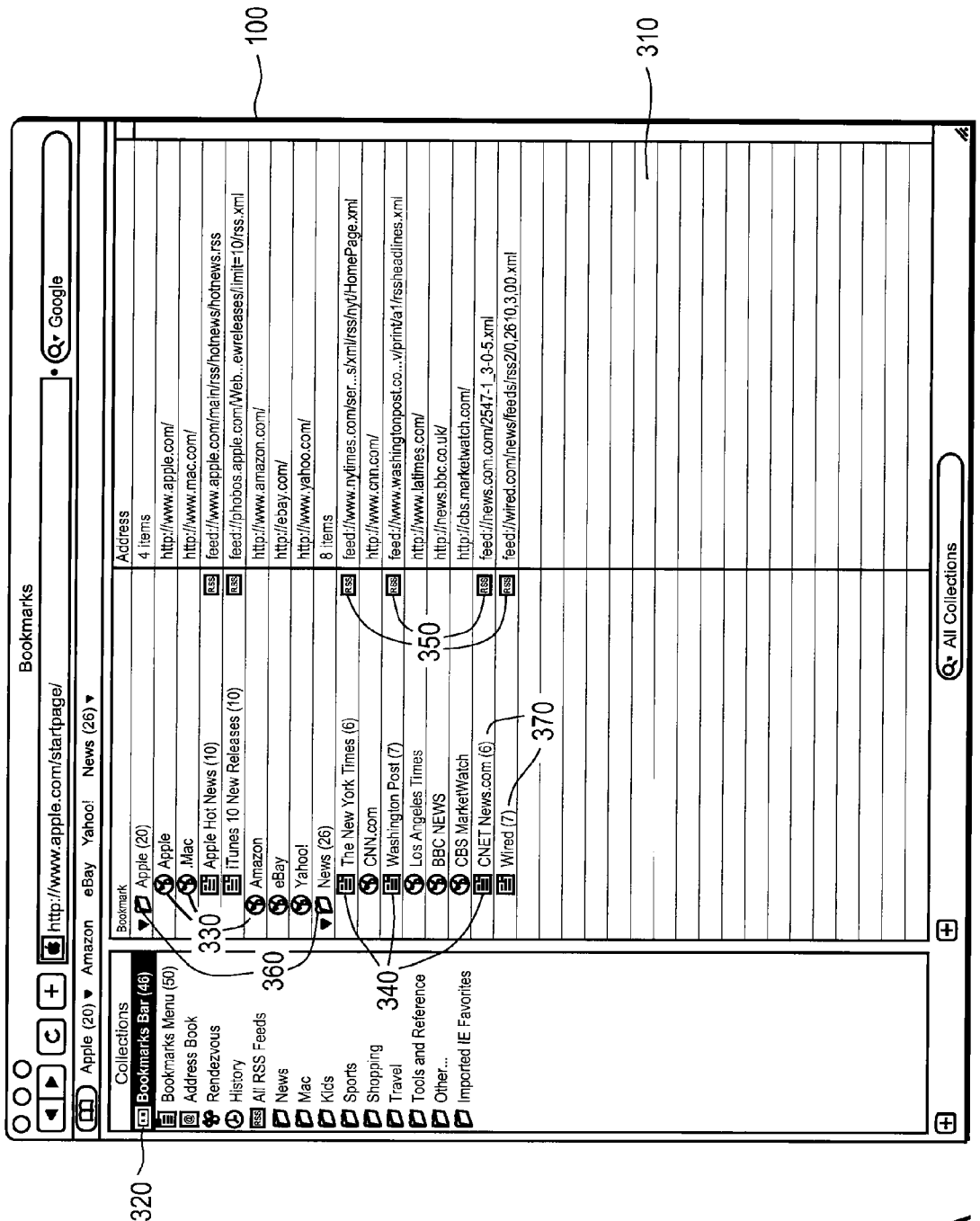
FIG. 3A is a screen shot depicting an example of a browser window, where the browser window is displaying a bookmark management view.

Once a feed has been bookmarked, a user can select the bookmark in order to navigate to the feed. Although the following figures show bookmarks in feed browser windows, they can also be implemented in feed viewers. FIG. 3A is a screen shot depicting an example of a browser window, where the browser window is displaying a bookmark management view. In one embodiment, feed browser window 100 displays the bookmark management view 310 in response to a command entered by a user, for example by clicking on the Bookmarks Bar icon 320, choosing a selection from a menu (not shown), or pressing a key (not shown).

In the illustrated embodiment, the bookmark management view 310 includes several bookmarks, including bookmarks for web pages and bookmarks for feeds. In the illustrated embodiment, a web page bookmark is indicated by a globe Favorites icon ("favicon" or "page icon") 330, while a feed bookmark is indicated by a newspaper favicon 340 and an RSS badge 350.

In one embodiment, a folder can be used to group and/or organize bookmarks, regardless of whether the bookmarks are for feeds or for web pages. In the illustrated embodiment, the bookmark management view 310 includes two folders, entitled "Apple" 360 and "News" 365. The News folder contains eight bookmarks, of which four are feeds (The New York Times, Washington Post, CNET News.com, and Wired) and four are web pages (CNN.com, Los Angeles Times, BBC NEWS, and CBS MarketWatch). In one embodiment, a folder can contain other folders, in addition to containing bookmarks. A first folder contained within a second folder is referred to as being "nested" within the second folder.

In one embodiment, a user can open all of the bookmarked items in a folder at once by selecting the folder. In one embodiment, if multiple bookmarked feeds exist, each feed opens in a different feed window or under a different tab (e.g., in a tabbed browser). In another embodiment, the bookmarked feeds are aggregated so that their articles form one feed and that one feed is then displayed in one feed window or under one tab (e.g., in a tabbed browser). In one embodiment, a feed contained in a first folder and a feed contained in a second folder (which is nested within the first folder) can also be aggregated, even though they are located in different levels of the folder hierarchy. Aggregation will be further discussed below.

In one embodiment, a bookmark can display the number of "read" and/or "unread" items in its associated feed. In the illustrated embodiment, a feed's "unread count" 370 is located adjacent to the name of the feed. For example, the Wired bookmark has an unread count 370 of 7. This means that there are seven unread articles in the Wired feed. The News folder 365 also has an unread count 370. Its unread count (26) is the sum of the unread counts 370 of the feeds whose bookmarks it contains.

Figure 3B:
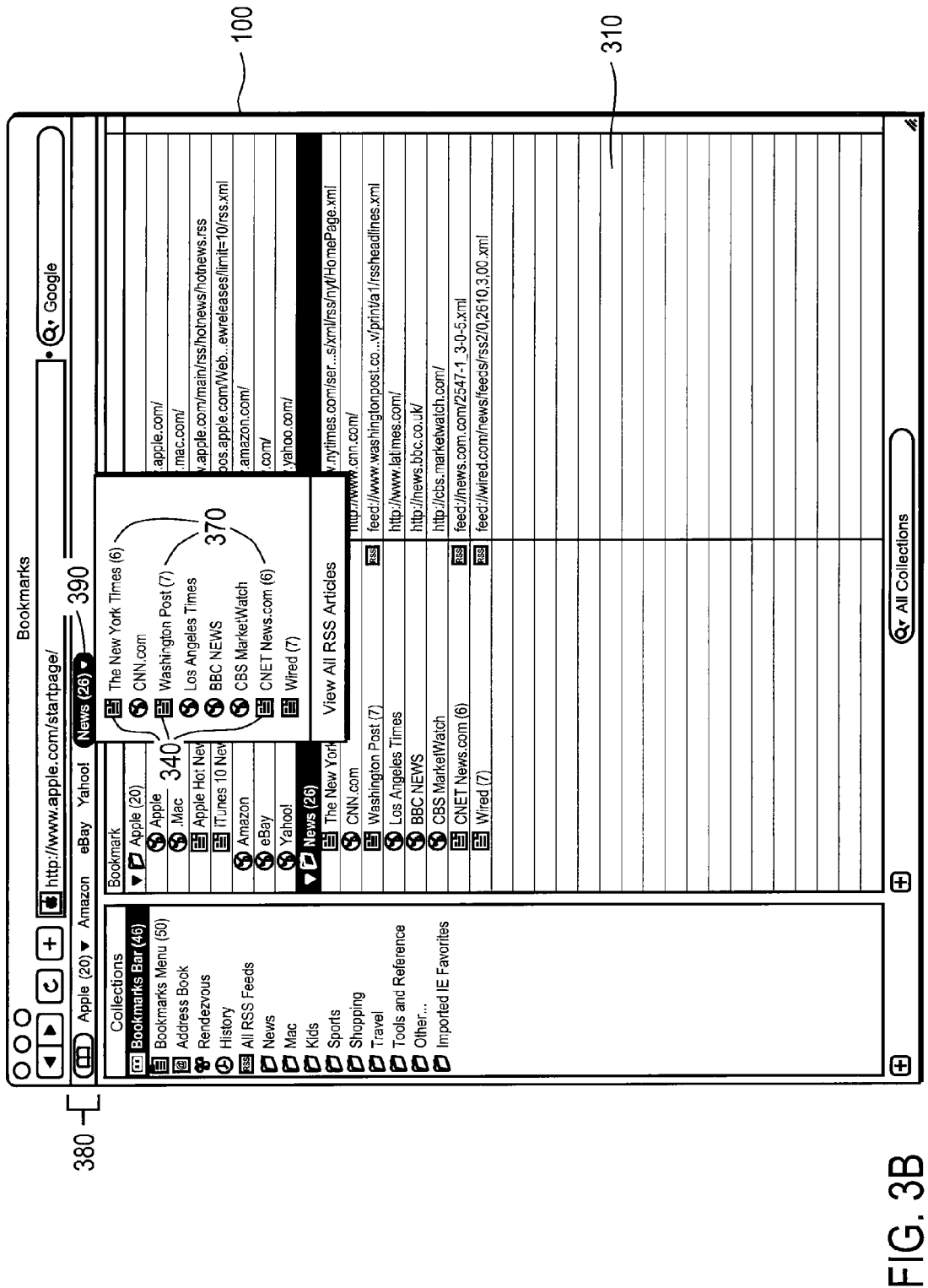
FIG. 3B is a screen shot depicting an example of a browser window, where the browser window is displaying a bookmark management view and the contents of the News folder are displayed from the bookmarks bar.

FIG. 3B is a screen shot depicting an example of a browser window, where the browser window is displaying a bookmark management view and the contents of the News folder are displayed from the bookmarks bar. In one embodiment, the contents of the News folder are displayed from the bookmarks bar 380 in response to a command entered by a user, for example by clicking on "News" 390 in the bookmarks bar 380.

The contents of the News folder are displayed in both the bookmark management view 310 and the bookmarks bar 380. Note that the feed bookmarks in the News folder in the bookmarks bar 380 include favicons 340 and unread counts 370.

Figure 3C:
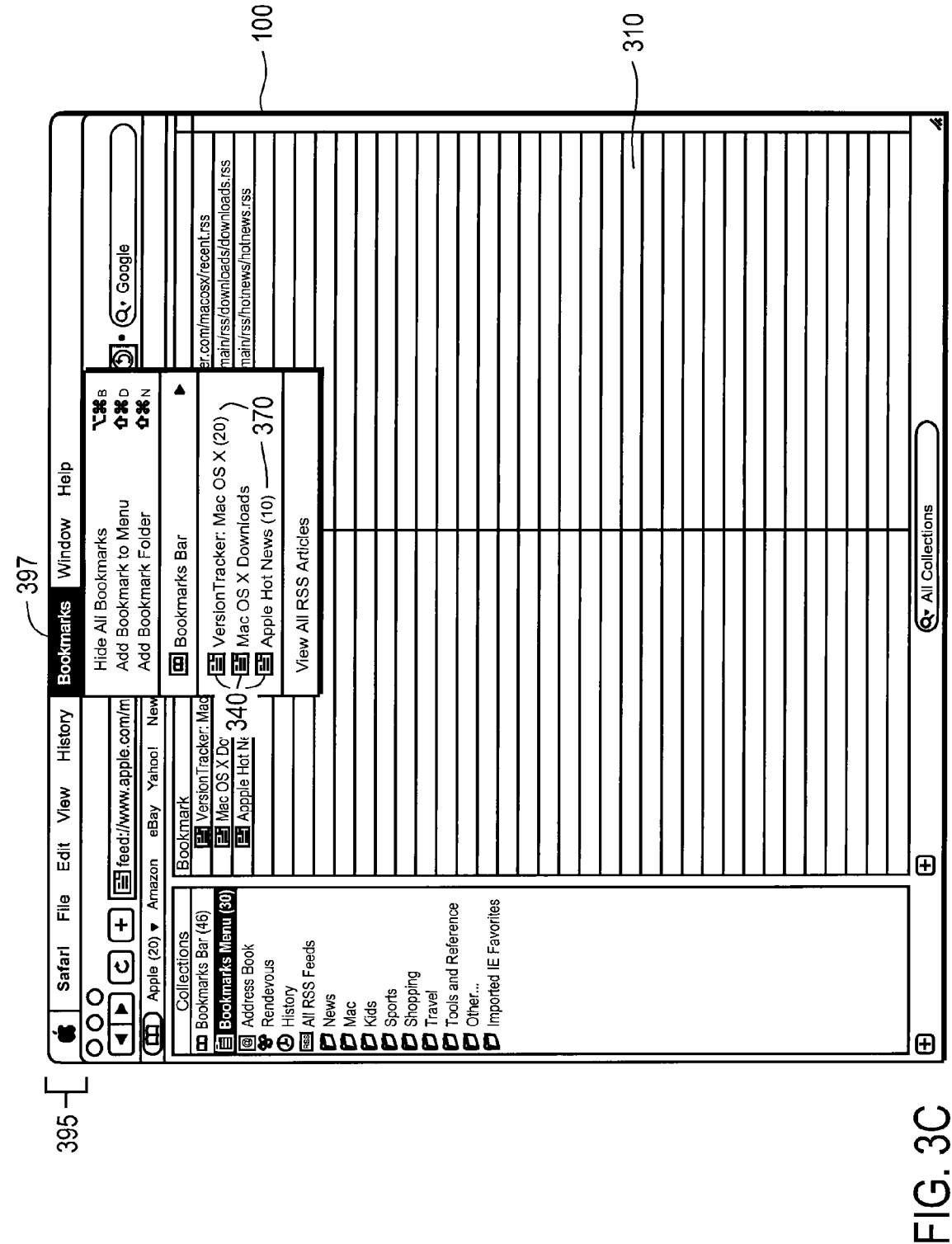
FIG. 3C is a screen shot depicting an example of a browser window, where the browser window is displaying a bookmark management view and the Bookmarks menu is displayed from the menu bar.

FIG. 3C is a screen shot depicting an example of a browser window, where the browser window is displaying a bookmark management view and the Bookmarks menu is displayed from the menu bar. In one embodiment, the contents of the Bookmarks menu are displayed from the menu bar 395 in response to a command entered by a user, for example by clicking on "Bookmarks" 397 in the menu bar 395. Note that the feed bookmarks in the Bookmarks menu include favicons 340 and unread counts 370.

In one embodiment, the data associated with a feed bookmark includes a URL. In another embodiment, the data includes modifications regarding how the feed should be displayed. Modifying how a feed is displayed will be further discussed below.

If the user does not know when feed publication occurs, another option is to "subscribe" to the feed. If a feed has been subscribed to, the user can be notified when new articles are added to a feed. For example, the feed URL can be polled periodically for updates. In one embodiment, if the feed has been updated, the new articles are downloaded to the user's feed viewer or an associated server. Subscription information can include, for example, an update frequency or a timestamp signifying the time that a feed URL was last checked for updates.

Modifying how a Feed is Displayed

In one embodiment, the present invention enables a user to modify how a feed is displayed. For example, the user can specify which content is to be displayed and/or the format in which it is to be displayed. Such functionality is particularly useful for feeds that include large numbers of articles, since such as large amount of information can overwhelm users. By providing a user with the ability to control what feed content is displayed and how it is displayed, the present invention makes such large feeds manageable and useful.

For example, the user can control the order in which articles are displayed by selecting a particular article characteristic. This characteristic could be, for example, article date, article title, or article source (e.g., the feed that published the article). Combining articles from different feeds will be discussed below.

In another embodiment, the user can specify which articles are to be displayed. For example, the user can restrict display based on article date (e.g., today, last seven days, or last month) and/or article source. A user can also specify that only articles that satisfy a search query be displayed. In one embodiment, articles are filtered as the user enters the search query (e.g., after each keystroke, or after a slight pause of predetermined length during user entry of the query). A user can also specify that only "unread" or "flagged" articles should be displayed. In one embodiment, if the number of articles to be displayed exceeds a particular threshold (e.g., 50), then the articles are divided into multiple pages, where a page includes a subset of the total articles to be displayed. Page size is selected to be some manageable and easily displayed quantity of articles, and need not correspond to screen or window size. If a page is large than a window, then a scroll bar can be used for navigating to other portions of the page. A user can navigate from one page to another by, for example, using links on the page that is currently being displayed.

In yet another embodiment, the user can control the amount of each article that is displayed. In one embodiment, this is achieved by manipulating a slider user interface element 420 (see FIG. 4A). For example, dragging the slider to the left shows less of each displayed article, while dragging the slider to the right shows more of each displayed article. In one embodiment, the far-right slider setting causes articles to be displayed in their entirety, while other slider settings cause only a portion of each displayed article to be displayed. In one embodiment, the far-left slider setting causes only the titles of articles to be shown. Alternatively, the far-left slider setting causes only the titles and one line (or sentence) of articles to be shown.

In one embodiment, a slider 420 setting affects the amount of each displayed article shown in an absolute way (e.g., so that the first 10 lines (or sentences) of an article are shown, regardless of the size of the article). Alternatively, a slider setting affects the amount of each displayed article shown in a relative way (e.g., so that half of the total lines (or sentences) of an article are shown).

In one embodiment, when an article is not shown in its entirety, the lines (or sentences) that are displayed are determined based on their location within the article (e.g., the first 5 sentences of the article are displayed or the last 5 sentences of the article are displayed). Alternatively, the lines (or sentences) that are displayed are determined based on their importance (e.g., the 5 most important sentences are displayed).

This is accomplished, for example, using the Search Kit API in the Carbon set of procedural APIs, which is available from Apple Computer, Inc. The function SKSummaryCreateWithString can be used to analyze a body of text (such as an article) and return an SKSummaryRef object. This object can then be used to determine a particular sentence of the original text based on that sentence's position within the text. For example, in order to obtain the third sentence, use "3" as the input to the function SKSummaryCopySentenceAtIndex. In order to obtain the middle sentence, use the function SKSummaryGetSentenceCount to determine the total number of sentences in the original text, then divide that number in half and use the result as the input to the function SKSummaryCopySentenceAtIndex.

An SKSummaryRef object can also be used to determine a particular sentence of the original text based on that sentence's importance relative to other sentences. The function SKSummaryGetSentenceSummaryInfo returns three arrays of information: 1) the ordinal numbers (e.g., "3" for the third sentence) of the n most important sentences, in order of occurrence in the original text; 2) the rank order number (in terms of relative importance) of each of these sentences; and 3) the ordinal paragraph number of each of these sentences, where n can range from 1 to the total number of sentences in the original text.

In one embodiment, the slider user interface element 420 affects all displayed articles in a feed simultaneously. In another embodiment, the slider user interface element 420 affects only one displayed article (for example, a currently selected article), or a subset of displayed articles, in a feed.

If the slider user interface element 420 affects several articles simultaneously, it can be time-consuming to determine, for each article, which sentences should be shown. In one embodiment, in order to decrease the time necessary to make this determination, each article is pre-processed before the slider setting is changed (e.g., when the article is initially displayed). This preprocessing can include creating an SKSummaryRef object, determining the total number of sentences in the article, and calling the SKSummaryGetSentenceSummaryInfo with n equal to the total number of sentences in the article.

Each sentence can then be tagged based on its rank order, and a Cascading Style Sheet (CSS) can control whether the sentence is displayed (or not) based on the tagged value. Then, when the slider is set to m (e.g., "5" would display 5 sentences per article), any sentence whose rank order was greater than m would not be displayed. As a result, only sentences with rank orders less than or equal to m (i.e., the most important m sentences) would be displayed. If each sentence in each article is tagged this way, then all of the articles will display the m most important sentences at the same time as the slider setting is changed.

The slider user interface element 420 is further described in the following patent applications, which are hereby incorporated by reference: U.S. Provisional Patent Application Ser. No. 60/582,868, filed on Jun. 25, 2004, entitled "Live Content Resizing" and U.S. patent application Ser. No. 10/951,915, filed on Sep. 27, 2004, entitled "Live Content Resizing."

In one embodiment, a feed viewer incorporates one or more user interface elements into its display, where the term "user interface element" includes any type of on-screen control or other input element. For example, a feed browser could convert a feed to HTML and generate an HTML page that contained the converted feed in one panel and the user interface elements in another panel. FIG. 4A is a screen shot depicting an example of a browser window, where the browser window is displaying a feed and user interface elements for controlling how the feed is displayed. In the illustrated embodiment, browser window 100 includes a feed panel 400 and a user interface element panel 410, which includes a slider user interface element 420 as described above.

User interface element panel 410 can also include a user interface element to trigger a particular action, such as emailing a link to the content displayed in the feed panel 400, bookmarking the URL of the content displayed in the feed panel 400, or bookmarking a search query (in order to filter the feed displayed in the feed panel 400). In one embodiment, a user interface element is displayed only if it makes sense based on the user's context. For example, if the URL of the content displayed in the feed panel 400 has already been bookmarked, a user interface element to bookmark the URL will not be shown. In other words, the presence of a user interface element can be context-dependent.

Scroll bar 430 can be used to scroll the contents displayed in feed browser window 100 so that different articles of a feed are displayed. In one embodiment, as the position of scroll bar 430 changes, the contents displayed in feed panel 400 and user interface element panel 410 scroll in unison. In this embodiment, if the feed is long, it is possible that scrolling to the end of it will cause user interface element panel 410 to cease displaying any user interface elements. In an alternate embodiment, depending on the position of scroll bar 430 and the contents in panels 400 and 410, scrolling may or may not be performed in unison. For example, the contents displayed in user interface element panel 410 remain the same while the contents displayed in feed panel 400 scroll. This functionality is beneficial because the user can access user interface elements displayed in user interface element panel 410 even when she has scrolled to the end of feed panel 400.

FIG. 4B is a screen shot depicting an example of a browser window, where the browser window is displaying an aggregate feed and user interface elements for controlling how the feed is displayed. Note that because there are so many articles in the feed, they are not displayed all at once in the window. Similarly, because there are so many user interface elements (here, the names of the source feeds that comprise the aggregate feed), they also are not displayed all at once in the window. The window in FIG. 4B is scrolled all the way to the top.

Figure 4D:
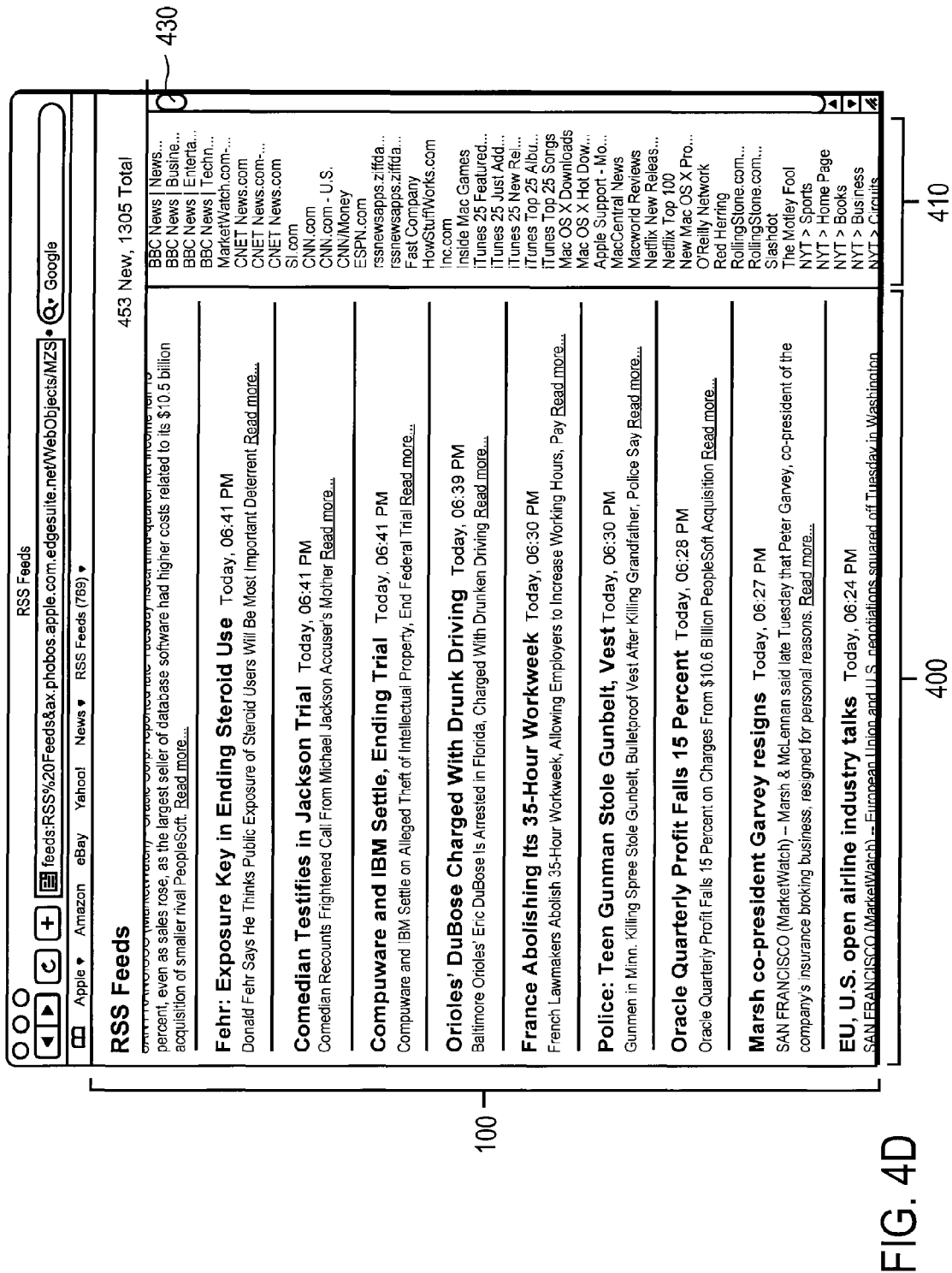
FIG. 4D is a screen shot depicting the browser window of FIG. 4C, where the browser window has been scrolled down to display different articles.

FIGS. 4C-4E are screen shots depicting the browser window of FIG. 4B, where the browser window has been scrolled down (to varying points) to display different articles. FIG. 4C is a screen shot depicting the browser window of FIG. 4B, where the browser window has been scrolled down to display different articles. In FIG. 4C, both the articles (feed panel 400) and the user interface elements (user interface element panel 410) have been scrolled down. Also, there are so many articles and user interface elements that some still have not been displayed. FIG. 4D is a screen shot depicting the browser window of FIG. 4C, where the browser window has been scrolled down to display different articles. In FIG. 4D, both the articles and the user interface elements have been scrolled down, and some articles and user interface elements still have not been displayed.

FIG. 4E is a screen shot depicting the browser window of FIG. 4D, where the browser window has been scrolled down to display different articles. Note that the articles (feed panel 400) have been scrolled down farther than the user interface elements (user interface element panel 410). This is because the user interface element panel 410 has reached the end of its content. This functionality is further described in the following patent application, which is hereby incorporated by reference: U.S. patent application Ser. No. 11/105,771, filed on the same date as the present application, entitled "Multiple-Panel Scrolling."

In yet another embodiment, a user can modify the format in which a feed is displayed. In one embodiment, a "theme" determines the format in which a feed is displayed. In one embodiment, a theme is specified using a set of template files and a set of format files. The template files specify which information is displayed (e.g., articles, article meta-data, and feed meta-data) and in what order. The format files specify the formatting of the information, such as fonts and colors. For example, a format file can specify that an "unread" content item is to be displayed differently than a "read" content item. Thus, by modifying a template file and/or a format file, the format in which a feed is displayed can be changed.

In one embodiment, a first template file describes three areas of a feed viewer content window: the top area (including, e.g., the title of the feed), the bottom-right area (including, e.g., user interface element panel 410), and the bottom-left area (including, e.g., feed panel 400). A second template file describes the bottom area of the feed viewer content window (including, e.g., pagination for when the number of articles to be displayed exceeds the threshold). A third template file describes how an article should be displayed (e.g., when it is displayed within feed panel 400). One skilled in the art will recognize that other arrangements, using different numbers or types of template files, can be used.

In one embodiment, the template files are used to generate HTML files. A template file can include, for example, HTML code and specialized tags. The specialized tags can be replaced with information when a feed is actually being processed for display. For example, the specialized tag <<title>> can be replaced with the title of the feed that is being processed. As another example, the specialized tag <<Sort By>> can be replaced with the phrase that means "Sort By," depending on the language preference of the user (e.g., English versus Japanese). (Sort By is used in user interface element panel 410.) In one embodiment, a format file is a style sheet (such as a Cascading Style Sheet (CSS)) that is used in conjunction with the HTML files generated using the template files.

In one embodiment, a modification regarding how a feed is to be displayed (such as which content is displayed and/or the format in which it is displayed) is stored so that it can be used again at a later time. Then, when the feed is viewed again, it will be displayed according to the stored modification. The stored modification can be associated with, for example, a particular feed or a particular user. If the modification is associated with a particular feed, then different modifications can be stored for different feeds. If the modification is associated with a particular user, then feeds viewed by that user will be displayed according to the stored modification.

Feed State

As described above, a user can specify several different types of information regarding a feed, which together make up the feed's state. This information can include, for example, whether the feed has been bookmarked, whether the feed has been subscribed to, and how the feed should be displayed in terms of content and formatting. Feed state can also include information about a specific content item, such as whether the item has been read (e.g., displayed) and/or whether it has been flagged. In one embodiment, a user can "flag" a content item of a feed. The flagged item can then be displayed differently than or separately from a non-flagged item. For example, a flagged item can be displayed in a different color or typeface or the like. As another example, only flagged items are displayed, while non-flagged items are not displayed.

A user may want to use different feed viewers, and even different computers or machines, to view the same feed. For example, she may want to view the feed from her laptop using one feed viewer and from her PDA using another feed viewer. While feed state information can be stored on a user's device or on a server, in one embodiment, such information is stored in a location (called a "feed state repository") that is accessible by feed viewers that might be used to view the feed. That way, if the state of the feed changes using one viewer, the change will be available to other viewers. For example, if a user views an article using one viewer, the feed state will describe the article as "read" the next time the user views the feed, even if she is using a different viewer.

In one embodiment, if the state of a feed changes, the feed viewer notifies the feed state repository, and the feed state repository updates the state accordingly. In another embodiment, when feed state information changes, a timestamp is stored regarding when the change occurred. In yet another embodiment, distributed notifications are used to notify interested processes (such as feed browsers or feed viewers) of the change.

While a feed can be stored as a flat file, in one embodiment, the feed is parsed and then stored in a structured way. This makes it easier to access information contained in the feed, including articles, article meta-data, and feed meta-data. In one embodiment, feeds are stored in a database, called a "feed database." This database can be, for example, an SQLite database (available from Hwaci—Applied Software Research of Charlotte, N.C.). Similarly, feed state information can be stored, for example, as a flat file or in a database.

Feed state information is usually specific to a particular user. One way to associate information in a database with a particular user is to store each user's information in a separate database. Another way is to have multiple users share a database and have a user's feed browser or feed viewer identify the user when it accesses the database.

While feed state information is usually specific to a particular user, the feed itself (e.g., the original syndication XML file) can be shared among multiple users. If the feed is stored in a database accessible by multiple users, then only one copy of each feed needs to be stored, regardless of how many users want to access it. In addition, if multiple users have subscribed to the feed, the feed source can be polled once and the new feed stored in the shared database, thereby decreasing traffic at the feed source's web server.

Building a Custom Feed

In one embodiment, the present invention enables a user to create a custom feed through aggregation and/or filtering of existing feeds. This custom feed can act as a "personal clipping service," gathering together articles of interest to the user. A custom feed has similar properties to a "simple" feed. For example, it can be bookmarked or subscribed to and its articles can have state, such as "read" or "flagged."

Aggregation includes, for example, merging the articles of multiple feeds to form a new feed. Aggregation enables a user to read articles from different source feeds without having to switching back and forth between the feeds or to visit many different web pages or other resources. A user can specify which feeds to aggregate. For example, a user can store bookmarks to multiple feeds in a single folder, thereby aggregating the feeds. As another example, a user can specify a feed to aggregate by typing in its URL or by choosing it from a list. In one embodiment, this list includes feeds to which the user has already subscribed. In another embodiment, this list includes feeds that the user has bookmarked (whether or not they have been subscribed to). In yet another embodiment, this list includes feeds that have been identified by others (arranged, for example, in a hierarchical listing based on topic).

Filtering includes, for example, selecting a subset of articles of a feed based on whether they satisfy a search query. A search query can include, for example, one or more search terms or phrases connected by Boolean operators. In one embodiment, articles are searched using string-based methods, such as those available in JavaScript (e.g., for searching articles displayed in a feed browser) or SQLite (e.g., for searching articles stored in an SQLite database). In one embodiment, any type of feed can be filtered, including both simple feeds and aggregate feeds.

In one embodiment, a search query can be made "persistent" by storing it in conjunction with a feed identifier. In this embodiment, when that feed is displayed, its articles will be filtered so that only articles that satisfy that search query will be displayed. One way to specify a persistent search is by appending the search query to the feed URL. For example, if the feed URL were "feed://www.apple.com/news.rss" and the search query were "safari," a persistent query could be specified by the alphanumeric string "feed://www.apple.com/news.rss?filter=safari." In this embodiment, the filtered feed can be shared with others by adding the string to a document, such as a web page or email. Entering the string into a feed browser or feed viewer (e.g., by typing it or by double-clicking on it) would then display the filtered feed.

Aggregation and/or filtering can be performed server-side (e.g., by a feed database or feed server) or client-side (e.g., by a feed browser or feed viewer). Server-side aggregation includes, for example, a feed database storing an aggregate feed and a feed browser accessing this feed. Client-side aggregation includes, for example, a feed database storing two simple feeds, and a feed browser accessing these simple feeds and aggregating them into one feed. Server-side filtering includes, for example, a feed database storing an unfiltered feed, filtering the feed based on a query, and making the filtered feed available to a feed browser. Client-side filtering includes, for example, a feed database storing an unfiltered feed, and a feed browser accessing this feed and filtering it.

Finding Articles

In one embodiment, a user can find articles from feeds that she has not bookmarked or subscribed to. The user can enter a search query into a search engine that searches feeds, which will identify one or more feed articles that satisfy the query. In one embodiment, the search query is augmented using additional information available to the feed viewer, such as localization information from the IP address or the time zone of the operating system and user interface language information (e.g., English versus Japanese) from the operating system.

In one embodiment, the search engine searches a database that stores feed articles. The articles in the database can be found by, for example, crawling a network (such as the World Wide Web) searching for feeds. The database can be located, for example, at a client (e.g., the user's computer) or at a server.

Once the articles that satisfy the query have been identified, the search engine returns the results. The results can be, for example, in the form of a web page containing one or more links. When the web page is presented and the user clicks on a link, a feed article will be displayed that satisfies the query. As another example, the articles that satisfy the query can be assembled into a feed. This feed can then be presented to the user. This is another type of "custom feed." In this embodiment, since the query result is simply another feed, the user can bookmark it, subscribe to it, assign state to its articles, etc. Regardless of the data format of the search results, they can be presented as-is or reformatted as desired (e.g., into a feed or web page).

In another embodiment, once the articles that satisfy the query have been identified, the feed identifiers (such as the feed URLs) of their source feeds are returned. The source feeds can then be aggregated into a new (custom) feed. The search query can be performed on the new feed to identify the desired articles.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method, comprising:

receiving, using one or more processors, input from a feed viewer corresponding to a feed state, wherein the feed state includes information corresponding to a feed including whether a feed has been bookmarked, whether a feed has been subscribed to, how a feed should be displayed, and whether a content item in a feed has been read;

storing the feed state information in a feed state repository accessible to a plurality of feed viewers on a plurality of devices;

receiving input from a feed viewer indicating one or more changes to the feed state information;

notifying the feed state repository of the one or more changes to the feed state information, wherein the feed state repository uses the one or more changes to update the feed state information, and wherein the updated feed state information is stored in the feed state repository; and providing the updated feed state information to each feed viewer on each device requesting the feed state information.

2. The method of claim 1, wherein notifying further comprises:

distributing notifications of the one or more changes to the feed state information to one or more processes.

3. The method of claim 1, wherein receiving input indicating one or more changes to the feed state information includes storing a time stamp corresponding to when each change occurred.

4. The method of claim 1, wherein feed state information includes information corresponding to one or more specific content items, and wherein each content item can be displayed differently.

5. The method of claim 1, further comprising:

parsing and structurally storing the feed.

6. A system, comprising:

one or more processors;

one or more computer-readable storage mediums containing instructions configured to cause the one or more processors to perform operations including:

receiving input from a feed viewer corresponding to a feed state, wherein the feed state includes information corresponding to a feed including whether a feed has been bookmarked, whether a feed has been subscribed to, how a feed should be displayed, and whether a content item in a feed has been read;

storing the feed state information in a feed state repository accessible to a plurality of feed viewers on a plurality of devices;

receiving input from a feed viewer indicating one or more changes to the feed state information;

notifying the feed state repository of the one or more changes to the feed state information, wherein the feed state repository uses the one or more changes to update the feed state information, and wherein the updated feed state information is stored in the feed state repository; and providing the updated feed state information to each feed viewer on each device requesting the feed state information.

7. The system of claim 6, wherein notifying further comprises:

distributing notifications of the one or more changes to the feed state information to one or more processes.

8. The system of claim 6, wherein receiving input indicating one or more changes to the feed state information includes storing a time stamp corresponding to when each change occurred.

9. The system of claim 6, wherein feed state information includes information corresponding to one or more specific content items, and wherein each content item can be displayed differently.

10. The system of claim 6, further comprising instructions configured to cause the one or more processors to perform operations including:

parsing and structurally storing the feed.

11. A computer-program product, tangibly embodied in a machine-readable storage medium, including instructions operable to cause a data processing apparatus to:

receive input from a feed viewer corresponding to a feed state, wherein the feed state includes information corresponding to a feed including whether a feed has been bookmarked, whether a feed has been subscribed to, how a feed should be displayed, and whether a content item in a feed has been read;

store the feed state information in a feed state repository accessible to a plurality of feed viewers on a plurality of devices;

receive input from a feed viewer indicating one or more changes to the feed state information;

notify the feed state repository of the one or more changes to the feed state information, wherein the feed state repository uses the one or more changes to update the feed state information, and wherein the updated feed state information is stored in the feed state repository; and provide the updated feed state information to each feed viewer on each device requesting the feed state information.

12. The computer-program product of claim 11, wherein notifying further comprises:

distributing notifications of the one or more changes to the feed state information to one or more processes.

13. The computer-program product of claim 11, wherein receiving input indicating one or more changes to the feed state information includes storing a time stamp corresponding to when each change occurred.

14. The computer-program product of claim 11, wherein feed state information includes information corresponding to one or more specific content items, and wherein each content item can be displayed differently.

15. The computer-program product of claim 11, further comprising instructions operable to cause a data processing apparatus to:

parse and structurally store the feed.

* * * * *

UNITED STATES PATENT AND TRADEMARK OFFICE
CERTIFICATE OF CORRECTION

| | | |
|---|---|---|
| PATENT NO. | : 7,840,527 B2 | Page 1 of 1 |
| APPLICATION NO. | : 11/370644 | |
| DATED | : November 23, 2010 | |
| INVENTOR(S) | : Jessica Kahn et al. | |

It is certified that error appears in the above-identified patent and that said Letters Patent is hereby corrected as shown below:

On the title page, item (56), under "Other Publications", in column 2, line 4, delete "Northewest" and insert -- Northwest --, therefor.

In column 9, line 58, delete "Tidy" and insert -- Tidy). --, therefor.

Signed and Sealed this

Twenty-fifth Day of October, 2011

David J. Kappos
*Director of the United States Patent and Trademark Office*